United States Patent [19]

Asahara et al.

[11] Patent Number: 5,583,182
[45] Date of Patent: Dec. 10, 1996

[54] BLOCK COPOLYMER AND PRESSURE SENSITIVE ADHESIVE COMPOSITION

[75] Inventors: Itsuo Asahara, Tokyo; Minoru Takematsu, Kanagawa, both of Japan

[73] Assignee: Nippon Zeon Co. Ltd., Tokyo, Japan

[21] Appl. No.: 397,121

[22] PCT Filed: Aug. 25, 1993

[86] PCT No.: PCT/JP93/01191

§ 371 Date: Mar. 2, 1995

§ 102(e) Date: Mar. 2, 1995

[87] PCT Pub. No.: WO94/05717

PCT Pub. Date: Mar. 17, 1994

[30] Foreign Application Priority Data

Sep. 4, 1992 [JP] Japan .................... 4-262807

[51] Int. Cl.$^6$ .................................... C08F 297/04
[52] U.S. Cl. .................. 525/314; 525/271; 525/98
[58] Field of Search ................. 525/314, 98, 271

[56] References Cited

U.S. PATENT DOCUMENTS

| | | | |
|---|---|---|---|
| 4,104,327 | 8/1978 | Inoue et al. | 524/505 |
| 4,120,915 | 10/1978 | Fodor et al. | 524/151 |
| 5,292,819 | 3/1994 | Diehl | 525/314 |
| 5,372,870 | 12/1994 | Diehl | 428/198 |
| 5,399,627 | 3/1995 | Diehl | 525/314 |

FOREIGN PATENT DOCUMENTS

| | | |
|---|---|---|
| 51-10623 | 4/1976 | Japan . |
| 53-42345 | 11/1978 | Japan . |
| 53-46880 | 12/1978 | Japan . |
| 63-83115 | 4/1988 | Japan . |

OTHER PUBLICATIONS

Japanese Industrial Standard (JIS), pp. 14–19, (1980).

*Primary Examiner*—Irina Zemel
*Attorney, Agent, or Firm*—Lowe, Price, LeBlanc & Becker

[57] ABSTRACT

A block copolymer comprising a polymer block of an aromatic vinyl compound, a polymer block of butadiene and a polymer block of isoprene, having a weight average molecular weight of 10,000–500,000, containing 10–50 wt. % of a bound aromatic vinyl compound, 10–60 wt. % of bound butadiene, 10–60 wt. % of bound isoprene, at most 15 wt. % of 1,2-vinyl bonds in a butadiene segment and at most 10 wt. % of 3,4-vinyl bonds in an isoprene segment, and having a storage modulus (G') of $10^6$–$3\times10^8$ Pa in a viscoelasticity measurement in a temperature range of from 0° C. to 50° C. and only one peak on loss tangent (tan δ) attributable to the butadiene polymer block and the isoprene polymer block in a temperature range of from −80° C. to −50° C. scarcely undergoes a change of melt viscosity with time. A pressure sensitive adhesive composition comprising the block copolymer and a tackifier is also provided.

6 Claims, 2 Drawing Sheets

BLOCK COPOLYMER AND PRESSURE SENSITIVE ADHESIVE COMPOSITION

TECHNICAL FIELD

The present invention relates to a novel block copolymer, and more particularly to a block copolymer which scarcely undergoes a change of melt viscosity with time and is suitable for use, particularly, as a base polymer for hot-melt type pressure sensitive adhesive compositions. The present invention also relates to a pressure sensitive adhesive composition comprising, as a base polymer, the novel block copolymer.

BACKGROUND ART

It is a well-known technique to date to use a thermoplastic elastomer, for example, a styrene-isoprene-styrene (SIS) block copolymer, a styrene-butadiene-styrene (SBS) block copolymer or the like as a base polymer for pressure sensitive adhesives and hot-melt type pressure sensitive adhesives. There has also been known a pressure sensitive adhesive composition making combined use of both SIS block copolymer and SBS block copolymer as a base polymer (Japanese Patent Publication No. 42345/1978).

By the way, a hot-melt type pressure sensitive adhesive has a feature that no organic solvent is used in its production stage and coating stage, and it can be handled in a molten state. Thermoplastic elastomers such as SIS block copolymers and SBS block copolymers are rubber-like elastic bodies at room temperature, but have characteristics that their viscosities rapidly decrease as their temperatures rise, and hence they turn fluid state. Therefore, such an elastomer is suitable for a base polymer in the hot-melt type pressure sensitive adhesive.

However, the conventionally-known thermoplastic elastomers of the block copolymer type are poor in heat stability. For example, the SIS type block copolymer undergoes heat deterioration upon its melt processing, and so its melt viscosity rapidly decreases. On the other hand, the SBS type block copolymer undergoes crosslinking upon its melt processing, and so its melt viscosity rapidly increases. Even in a blend system of these copolymers, its melt viscosity rapidly increases due to change with time upon its heating.

Therefore, upon hot-melt processing, hot-melt type pressure sensitive adhesives separately comprising these block copolymers as base polymers require to shorten the storage time of melts before coating and heating time upon processing as much as possible and to strictly control their melt processing temperature. Accordingly, these hot-melt type pressure sensitive adhesives involve a problem that workability upon coating is poor.

On the other hand, there has been proposed a process for producing a heat-stable resinous polymer by first polymerizing styrene in the presence of an organic lithium initiator, next successively adding isoprene and butadiene to polymerize them and then introducing a polyfunctional coupling agent to couple the polymers formed (Japanese Patent Publication No. 46880/1978). However, a polymer obtained by this process is in the form of a resin containing 70–95 wt. % of styrene. Therefore, good pressure-sensitive adhesion properties cannot be achieved if the polymer is used as a base polymer for a pressure sensitive adhesive.

DISCLOSURE OF THE INVENTION

It is an object of the present invention to provide a novel block copolymer which has the characteristics as a thermoplastic elastomer, scarcely undergoes a change of melt viscosity with time and is excellent in heat stability.

It is another object of the present invention to provide a novel block copolymer suitable for a base polymer for pressure sensitive adhesive compositions, particularly, hot-melt type pressure sensitive adhesive compositions.

It is a further object of the present invention to provide a pressure sensitive adhesive composition comprising, as a base polymer, a novel block copolymer excellent in heat stability, particularly, a hot-melt type pressure sensitive adhesive composition excellent in coating properties, flowability, pressure-sensitive adhesion properties and the like.

The present inventors have carried out an extensive investigation with a view toward overcoming the above-described problems involved in the prior art. As a result, it has been found that a block copolymer comprising a polymer block (S) of an aromatic vinyl compound, a polymer block (B) of butadiene and a polymer block (I) of isoprene, containing the copolymerizing components in specific proportions and having specific physical properties has the characteristics as a thermoplastic elastomer and exhibits excellent heat stability, and that a pressure sensitive adhesive comprising, as a base polymer, this block copolymer exhibits excellent pressure-sensitive adhesion properties.

The block copolymer according to the present invention is a block copolymer of the (S—B—I—S) type, (S—B—I)$_n$—X type or (S—I—B)$_n$—X type in which n is an integer of 2–4, and X is a residue of a coupling agent.

Since the block copolymer according to the present invention is excellent in heat stability, the hot-melt type pressure sensitive adhesive composition comprising, as a base polymer, this block copolymer scarcely undergoes a change of melt viscosity with time even if its melting temperature is elevated, and hence is excellent in coating properties and flowability.

The present invention has been led to completion on the basis of these findings.

According to the present invention, there is thus provided a block copolymer:

(a) comprising a polymer block of an aromatic vinyl compound, a polymer block of butadiene and a polymer block of isoprene;

(b) having a weight average molecular weight of 10,000–500,000;

(c) containing a bound aromatic vinyl compound in a proportion of 10–50 wt. %;

(d) containing bound butadiene in a proportion of 10–60 wt. %;

(e) containing bound isoprene in a proportion of 10–60 wt. %;

(f) containing 1,2-vinyl bonds in a butadiene segment in a proportion of at most 15 wt. %;

(g) containing 3,4-vinyl bonds in an isoprene segment in a proportion of at most 10 wt. %;

(h) having a storage modulus (G') of $10^6$–$3 \times 10^8$ Pa in a viscoelasticity measurement in a temperature range of from 0° C. to 50° C.; and (i) having only one peak on loss tangent (tan δ) attributable to the butadiene polymer block and the isoprene polymer block in a temperature range of from −80° C. to −50° C.

The block copolymer according to the present invention is a block copolymer having a structure represented by the following general formula [1], [2] or [3]:

(S—B—X—S)          [1]

(S—B—I)$_n$—X       [2]

(S—I—B)$_n$—X       [3]

wherein S is the polymer block of the aromatic vinyl compound, B is the polymer block of butadiene, I is the polymer block of isoprene, n is an integer of 2–4, and X is a residue of a coupling agent.

According to the present invention, there is also provided a pressure sensitive adhesive composition comprising 100 parts by weight of the block copolymer and 20–200 parts by weight of a tackifier.

BEST MODE FOR CARRYING OUT THE INVENTION

Figure 1:
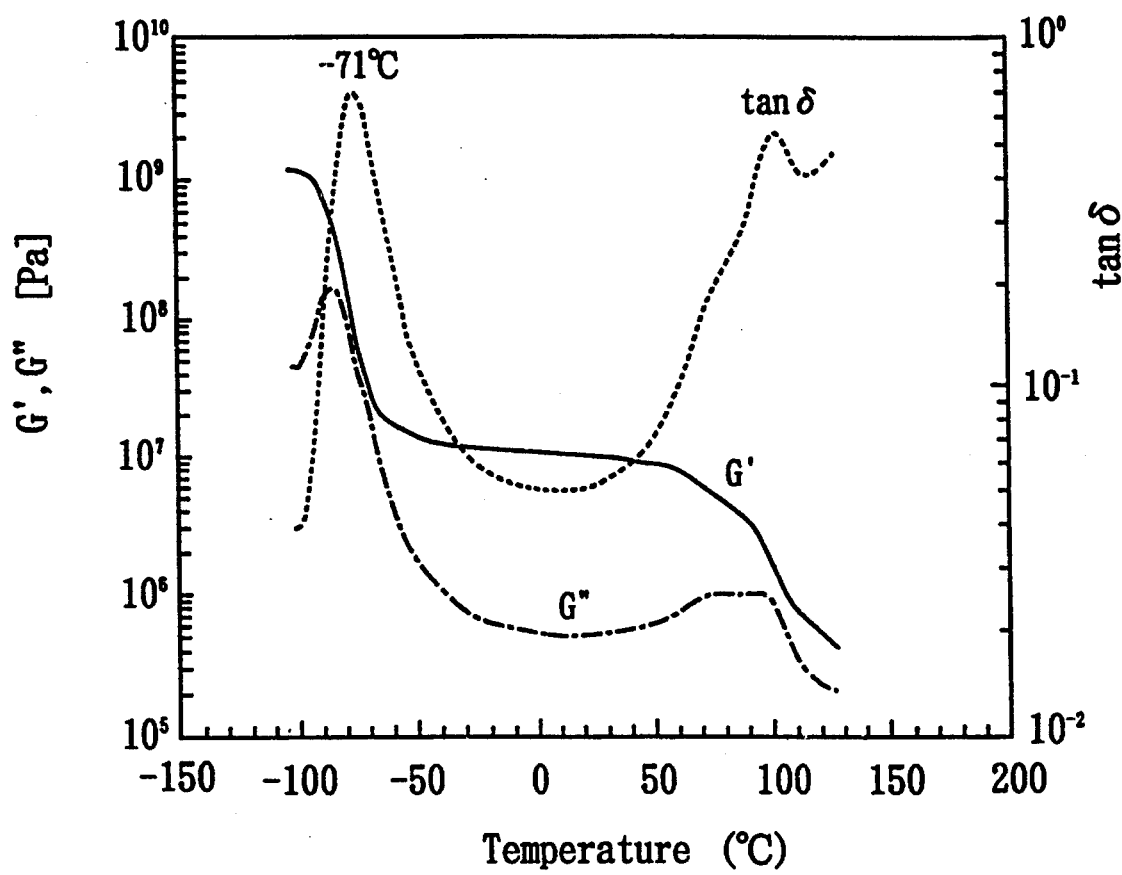
FIG. 1 is a chart illustrating the results of viscoelasticity measurement on a block copolymer of the present invention, which was obtained in Example 3.

Block copolymer:

The block copolymer according to the present invention is represented by the following general formula [1], [2] or [3]:

(S—B—I—S)          [1]

(S—B—I)$_n$-X       [2]

(S—I—B)$_n$-X       [3]

In these formulae, S is the polymer block of the aromatic vinyl compound, B is the polymer block of butadiene, I is the polymer block of isoprene. n is an integer of 2–4. X is a residue of a coupling agent.

S, B and I include a substantial polymer block of the aromatic vinyl compound, a substantial polymer block of butadiene and a substantial polymer block of isoprene, respectively. Here, the term "substantial" means the case where the individual blocks mutually contain a small amount of bound units derived from other copolymerizing components, the case where B or I is a tapered block polymer which contains a small amount of styrene units in a proportion gradually increasing from one end to the other end of its block, or the case where at least a part of B or I is modified by hydrogenation.

As examples of the aromatic vinyl compound useful in the practice of the present invention, may be mentioned styrene, α-methylstyrene, p-methylstyrene, m-methylstyrene, o-methylstyrene, p-tert-butylstyrene, dimethylstyrene and vinylnaphthalene. Of these, styrene is particularly preferred from the viewpoints of easy availability, reactivity, physical properties of the resulting block copolymer, and the like. Butadiene and isoprene are used as conjugated diene compounds.

In the block copolymers [1], [2] and [3] according to the present invention, the proportion of a bound aromatic vinyl compound is 10–50 wt. %, preferably 15–45 wt. % in total. The proportion of bound butadiene is 10–60 wt. %, preferably 15–45 wt. % in total. The proportion of bound isoprene is 10–60 wt. %, preferably 25–55 wt. % in total.

If the proportion of the bound aromatic vinyl compound is lower than 10 wt. %, holding power is lowered when the resulting block copolymer is used as a base polymer for a pressure sensitive adhesive. On the contrary, any proportion exceeding 50 wt. % results in a pressure sensitive adhesive lowered in tackiness. If the proportion of the bound butadiene is lower than 10 wt. %, the melt viscosity of the resulting block copolymer is decreased due to variation with time, and moreover the holding power is lowered. On the other hand, if the proportion exceeds 60 wt. %, the melt viscosity of the resulting block copolymer is increased due to variation with time. If the proportion of the bound isoprene is lower than 10 wt. %, the melt viscosity of the resulting block copolymer is increased due to variation with time. On the other hand, if the proportion exceeds 60 wt. % the melt viscosity of the resulting block copolymer is decreased due to variation with time, and moreover the holding power is lowered. If the proportions of the bound styrene, bound butadiene and bound isoprene fall within the above-described ranges, respectively, a pressure sensitive adhesive good in all tack, adhesive strength and holding power can be provided when the resulting block copolymer is used as a base polymer for the pressure sensitive adhesive. Besides, if the proportions of the bound butadiene and bound isoprene fall within the above-described ranges, respectively, a block copolymer which is excellent in heat resistance and scarcely undergoes a change of melt viscosity upon melt processing can be provided.

The respective block copolymers according to the present invention each have a weight average molecular weight (in terms of polystyrene) ranging from 10,000 to 500,000, preferably from 50,000 to 200,000 as determined by gel permeation chromatography (GPC). Any weight average molecular weight lower than 10,000 results in a pressure sensitive adhesive lowered in holding power. On the other hand, any weight average molecular weight higher than 500,000 results in a pressure sensitive adhesive lowered in tackiness and deteriorated in coating properties and processability.

The respective block copolymers according to the present invention each contain 1,2-vinyl bonds in a butadiene segment in a proportion of at most 15 wt % and 3,4-vinyl bonds in an isoprene segment in a proportion of at most 10 wt. %. The respective block copolymers according to the present invention each have a storage modulus (G') of $10^6$–$3\times10^8$ Pa in a viscoelasticity measurement in a temperature range of from 0° C. to 50° C., and only one peak on loss tangent (tan δ) attributable to the butadiene polymer block and the isoprene polymer block in a temperature range of from −80° C. to −50° C. For example, when an S—I—S type block copolymer and an S—B—S type block copolymer are blended, two peaks on loss tangent (tan δ) attributable to the butadiene polymer block and the isoprene polymer block, respectively, appear in a temperature range of from −80° C. to −50° C.

When the block copolymer having a storage modulus (G') lower than $10^6$ Pa is used as a base polymer for a pressure sensitive adhesive, its holding power is lowered. On the contrary, any storage modulus exceeding $3\times10^8$ Pa results in a pressure sensitive adhesive lowered in tackiness.

As examples of the coupling agent, may be mentioned tin coupling agents such as tin dichloride, monomethyltin dichloride, dimethyltin dichloride, monoethyltin dichloride, diethyltin dichloride, methyltin trichloride, monobutyltin dichloride, dibutyltin dibromide, monohexyltin dichloride and tin tetrachloride; halogenated silicon coupling agents such as dichlorosilane, monomethyldichlorosilane, dimethyldichlorosilane, monoethyldichlorosilane, diethyldichlorosilane, monobutyldichlorosilane, dibutyldichlorosilane, monohexyldichlorosilane, dihexyldichlorosilane, dibromosilane, monomethyldibromosilane, dimethyldibromosilane, silicon tetrachloride and silicon tetrabromide; alkoxysilanes such as tetramethoxysilane; divinyl aromatic compounds such as divinylbenzene and divinylnaphthalene; halogenated alkanes such as dichloroethane, dibromoethane, methylene chloride, dibromomethane, dichloropropane, dibromopropane, chloroform, trichloroethane, trichloropropane and tribromopropane; halogenated aromatic compounds such as dibromobenzene; and other coupling agents such as benzoic esters, CO, 2-chloropropene and 1-chloro-1,3-butadiene. Of these, dibromobenzene, tetramethoxysilane and the like are preferred.

Preparation process of block copolymer:

The block copolymers [1], [2] and [3] according to the present invention can be prepared by successively polymerizing the respective polymer blocks in a hydrocarbon solvent using an organic lithium compound as a polymerization initiator in accordance with the conventionally-known method. However, the block copolymers represented by the general formulae [2] and [3] are obtained by successively polymerizing the respective polymer blocks of S—B—I and S—I—B and then conducting a coupling reaction with the coupling agent making good use of their active terminals.

Examples of the hydrocarbon solvent used in the preparation of the block copolymers include cyclopentane, cyclohexane, benzene, ethylbenzene, xylene and mixed solvents of these compounds with pentane, hexane, heptane, butane or the like.

Examples of the organic lithium compound used as the polymerization initiator include n-butyllithium, secbutyllithium, tert-butyllithium, n-hexyllithium, isohexyllithium, phenyllithium and naphthyllithium. The polymerization initiator is used in a range of 0.01–1 part by weight per 100 parts by weight of the monomer.

The block copolymer represented by the general formula [1] can be obtained by (1) first polymerizing the aromatic vinyl compound in the hydrocarbon solvent using the organic lithium as a polymerization initiator, and then successively conducting (2) polymerization of butadiene, (3) polymerization of isoprene, and (4) polymerization of the aromatic vinyl compound.

The block copolymer represented by the general formula [2] can be obtained by (1) first polymerizing the aromatic vinyl compound in the hydrocarbon solvent using the organic lithium as a polymerization initiator, next successively conducting (2) polymerization of butadiene, and (3) polymerization of isoprene, and then adding the coupling agent to conduct a coupling reaction making good use of their active terminals.

The block copolymer represented by the general formula [3] can be obtained by (1) first polymerizing the aromatic vinyl compound in the hydrocarbon solvent using the organic lithium as a polymerization initiator, next successively conducting (2) polymerization of isoprene, and (3) polymerization of butadiene, and then adding the coupling agent to conduct a coupling reaction making good use of their active terminals.

In the coupling reaction, n is preferably 2 or 3.

Pressure sensitive adhesive composition:

Each of the block copolymers [1], [2] and [3] according to the present invention can be used as a base polymer for pressure sensitive adhesives, and in particular, can be suitably used as a base polymers for hot-melt type pressure sensitive adhesive compositions making good use of its characteristics as a thermoplastic elastomer and good heat stability.

The pressure sensitive adhesive compositions according to the present invention comprise 100 parts by weight of at least one block copolymer selected from the group consisting of the block copolymers [1], [2] and [3] and 20–200 parts by weight of a tackifier. A softener may also be incorporated in a proportion of 0–100 parts by weight.

As the tackifier useful in the practice of the present invention, there may be preferably used a low-molecular weight resin having a number average molecular weight of 300–3,000 and a softening point of 60°–130° C. as measured on the basis of the ring and ball method prescribed by JIS K-2207. Specific examples thereof include rosin and rosin derivatives, polyterpene resins, aromatically modified terpene resins and hydrogenated products thereof, terpene phenol resins, cumarone.indene resins, aliphatic petroleum resins, aromatic petroleum resins and hydrogenated products thereof, aliphatic.aromatic copolymerization petroleum resins, dicyclopentadiene petroleum resins and hydrogenated products thereof, and low-molecular weight polymers of styrene or substituted styrene.

Those compatible with the butadiene polymer block or isoprene polymer block of the block copolymers are preferred as the tackifier. Preferable examples thereof include the polyterpene resins, the aliphatic petroleum resins and the hydrogenated products of the aromatic petroleum resins. With a view toward improving the cohesion of the resulting pressure sensitive adhesive composition, the cumarone.indene resin or the low-molecular weight polymer of styrene or substituted styrene, which is compatible with the polymer block of the aromatic vinyl compound, may also be incorporated together with the tackifier compatible with the conjugated diene polymer blocks.

Examples of the softener include petroleum process oils such as paraffinic process oil, naphthenic process oil and aromatic process oil; natural oils such as castor oil and tall oil; dialkyl esters of dibasic acids, such as dibutyl phthalate, dioctyl phthalate and dibutyl adipate; and low-molecular weight liquid polymers such as liquid polybutene and liquid polyisoprene. The use of the paraffinic process oil or liquid polybutene of these softeners permits the provision of a pressure sensitive adhesive particularly stable to heat and ultraviolet rays and excellent in hue.

In the pressure sensitive adhesive composition according to the present invention, the tackifier is used in a proportion of 20–200 parts by weight, preferably 30–180 parts by weight per 100 parts by weight of the block copolymer. Any proportion lower than 20 parts by weight results in a pressure sensitive adhesive composition lowered in tackiness. On the contrary, any proportion exceeding 200 parts by weight results in a pressure sensitive adhesive composition lowered in holding power. The softener is used in a proportion of 0–100 parts by weight, preferably 5–150 parts by weight, more preferably 10–130 parts by weight. Any proportion departed from this range makes it difficult to provide a pressure sensitive adhesive composition having well balanced physical properties.

Other rubber components may be incorporated into the pressure sensitive adhesive compositions according to the present invention within limits not impeding the objects of the present invention. Further, additives such as antioxidants, pigments and fillers may be suitably incorporated as desired.

No particular limitation is imposed on the preparation process of the pressure sensitive adhesive composition. Therefore, there may be used any process such as a mechanically mixing process making use of rolls, a Banbury mixer or a Dalton kneader, a hot-melt process characterized in that heating and mixing are conducted by using a melting kettle equipped with a stirrer or a single- or twin-screw extruder, or a solvent process in which the compounding components are poured in a suitable solvent and stirred, thereby obtaining an intimate solution of the pressure sensitive adhesive composition.

The pressure sensitive adhesive compositions according to the present invention may be applied without using any solvent or in the form of their solutions to a base material such as paper or a plastic film by means of a proper coater, thereby producing various kinds of pressure sensitive adhesive tapes or sheets.

The respective block copolymers according to the present invention are excellent in heat stability and hence scarcely undergo a change of melt viscosity with time upon heating and melting them. Therefore, the pressure sensitive adhesive composition comprising, as a base polymer, any one of these copolymers can be suitably used, in particular, as a hot-melt type pressure sensitive adhesive composition. The hot-melt type pressure sensitive adhesive composition according to the present invention scarcely undergoes a change of melt viscosity even when melting temperature is elevated, and so it may be applied to the base material with good flowability by its melting even when using no solvent.

The pressure sensitive adhesive composition may be used as an adhesive or a sealant without applying to the base material, by fluidizing it by, for example, a method in which it is heated and melted, or it is dissolved in a suitable solvent.

EXAMPLES

The present invention will hereinafter be described more specifically by reference to the following examples and comparative examples. However, this invention is not limited to these examples only. Incidentally, all designations of "part" or "parts" and "%" as will be used in the following examples mean part or parts by weight and wt. % unless expressly noted. The measurements of physical properties were conducted in accordance with the following methods.

Amount of bound styrene:
Measured by the NMR method.

Amount of vinyl bond:
The microstructures of a butadiene segment and an isoprene segment were determined by the MNR (nuclear magnetic resonance) method.

Weight average molecular weight:
The weight average molecular weight of each of the resulting block copolymers was determined from a molecular weight distribution curve measured by means of a high-performance liquid chromatography (HCL-802A, manufactured by Tosoh Corp.) on the basis of a calibration curve obtained from the results of analysis of a standard polystyrene the molecular weight of which had been already known. In the determination, columns G-4000H and G-5000 in which polystyrene gel was packed were used in combination to conduct the determination under conditions of a column temperature of 40° C., a-flow rate of a carrier (tetrahydrofuran) of 1.3 ml/min and a sample concentration of 0.6 g/l.

Melt viscosity:
Changes of melt viscosity with time were expressed in terms of ratios of melt viscosities after 5 minutes, 10 minutes and 15 minutes to an initial melt viscosity (0 minute) of each block copolymer as measured by means of a flow tester at 240° C. This value nearer to 1.0 means that the change of melt viscosity with time is smaller, and so such a block copolymer is excellent in heat stability.

Measurement of viscoelasticity:
Measuring conditions of G'(storage modulus), G" (loss modulus) and tan δ (loss tangent) are as follows:

(i) Apparatus: Rheometrics Dynamic Analyzer II (RDA II) (manufactured by Rheometrics Co.);

(ii) Testing method: torsion rectangular test;

(iii) Specimen: a strip specimen 42 mm long×12.5 mm wide×2 mm thick;

(iv) Frequency: 6.28 rad/sec;

(v) Range of measuring temperature: −100° C. to 120° C.

Pressure-sensitive adhesion properties:
A solution of a pressure sensitive adhesive containing nonvolatile matter in a concentration of 50% was prepared. This solution was applied to a polyester film 25 μm thick to give a coat thickness of 25 μm, thereby producing a pressure sensitive adhesive tape. The tackiness, adhesive strength and holding power of the thus-obtained tape were measured.

(1) The tackiness was determined in the following manner in accordance with JIS Z-0237. A pressure sensitive adhesive tape 10 cm long was stuck at 23° C. on a slant face of a stainless steel plate placed at an inclination angle of 30 degrees with its adhesive face upside. Thirty steel balls of sizes from 3/32 inch up to 32/32 inch were separately rolled at an initial velocity of 0 along the slant face from the upper position 10 cm distant from the tape. The tackiness was expressed in terms of the size (the average value of the numbers of 5 balls) of the ball in the greatest diameter, which was stopped on the pressure sensitive adhesive tape at this time.

(2) The adhesive strength was determined in the following manner in accordance with JIS Z-0237. A pressure sensitive adhesive tape cut into 10 mm wide×100 mm long was stuck on a stainless steel plate polished with waterproof abrasive paper No. 280. The thus-stuck tape was then peeled off at 23° C. in a direction of 180 degrees at a rate of 200 mm/min to determine the adhesive strength (unit: g/cm).

(3) The holding power was determined in the following manner in accordance with JIS Z-0237. A pressure sensitive adhesive tape was stuck on a stainless steel plate treated in the same manner as described above so as to come into contact at its area of 25 mm×10 mm. A load of 1 kg was then applied thereto at 23° C., thereby measuring the time required until the pressure sensitive adhesive tape was slid off from the stainless steel plate (unit: minute).

Examples 1–5

Synthesis of block copolymer:
Styrene (ST), butadiene (BD), isoprene (IP) and styrene (ST) were successively added into 1500 g of a cyclohexane solvent in a 3-liter autoclave in a dry nitrogen atmosphere to polymerize them at 60° C. for 5 hours by using 5.7 millimoles of n-butyllithium as a polymerization initiator, thereby producing five kinds of S—B—I—S type block copolymers shown in Table 1. Incidentally, the total weight of ST, BD and IP used was 400 g. The measurement results of the weight average molecular weight, amount of vinyl bonds in the conjugated diene segments and viscoelasticity on the thus-obtained block copolymers were shown in Tables 1–2.

The measurement results of the viscoelasticity on the block copolymer (S—B—I—S=15:45:25:15) obtained in Example 3 are also illustrated in FIG. 1. As apparent from FIG. 1, in the block copolymer (Example 3) according to the present invention, only one peak on loss tangent (tan δ), which was attributable to the butadiene polymer block and the isoprene polymer block exists at −71° C.

Preparation of pressure sensitive adhesive composition:

Pressure sensitive adhesive compositions were prepared in accordance with the following formulation (the same shall apply to the following examples), thereby measuring their pressure-sensitive adhesion properties. More specifically, the respective ingredients were kneaded in a Dalton kneader in accordance with the following formulation. Thereafter, each of the resulting compositions was dissolved in toluene (concentration of nonvolatile matter: 50%). This solution was applied to a polyester film 25 μm thick to give a coat thickness of 25 μm, thereby producing a pressure sensitive adhesive tape. The results are shown collectively in Table 2.

| (Formulation of pressure sensitive adhesive composition) | |
| --- | --- |
| Block copolymer | 100 parts |
| Tackifier (hydrogenation product of aromatic petroleum resin) | 170 parts |
| Softener (paraffinic process oil) | 65 parts |
| Antioxidant | 0.3 part |

Examples 6–7

Styrene (ST), butadiene (BD) and isoprene (IP) were successively added into a cyclohexane solvent to polymerize them at 60° C. for 5 hours by using n-butyllithium as a polymerization initiator. Thereafter, dibromobenzene was used as a coupling agent to conduct a coupling reaction, thereby producing (S—B—I)$_n$—X type block copolymers shown in Table 1. The measurement results of the weight average molecular weight, amount of vinyl bonds in the conjugated diene segments and viscoelasticity on the thus-obtained block copolymers were shown in Tables 1–2. The measurement results on the viscoelasticity are also shown in Table 2.

Comparative Examples 1–2

Block copolymers in which the proportion of the butadiene polymer block or isoprene polymer block was outside the range of the present invention were produced in the same manner as in Examples 1–5. The results are shown in Tables 1–2.

Comparative Examples 3–4

S—I—S type and S—B—S type block copolymers were produced in the same manner as in Examples 1–5. The results are shown in Tables 1–2.

Comparative Examples 5–6

Figure 2:
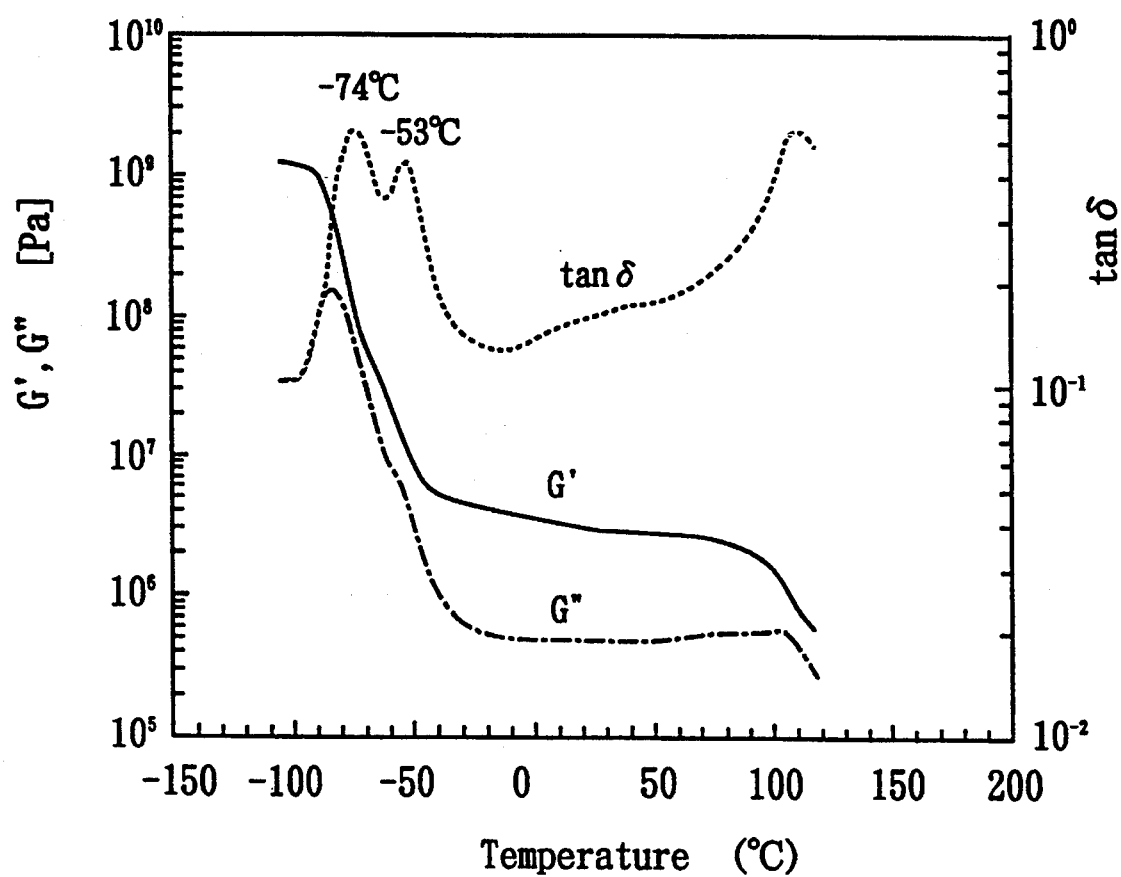
FIG. 2 is a chart illustrating the results of viscoelasticity measurement on a blend obtained in Comparative Example 5 (SBS/SIS=5/2).

The S—I—S type and S—B—S type block copolymers produced in Examples 3–4, respectively, were blended with their blending proportions varied. The results are shown in Tables 1–2. The results of the viscoelasticity on the blend (SBS/SIS=5/2) obtained in Comparative Example 5 are also illustrated in FIG. 2. As apparent from FIG. 2, in this blend, two peaks on loss tangent (tan δ), which was attributable to the butadiene polymer block and the isoprene polymer block, were observed at −74° C. and −53° C.

The results are shown in Tables 1–2.

TABLE 1

| | Molecular structure of block copolymer | Composition of polymer block (wt. %) | | | | MW × $10^{-4}$ | Amount of 3,4-vinyl in isoprene polymer block (%) | Amount of 1,2-vinyl in butadiene polymer block (%) |
| --- | --- | --- | --- | --- | --- | --- | --- | --- |
| | | ST | BD | IP | ST | | | |
| Ex. 1 | S—B—I—S | 15 | 15 | 55 | 15 | 12.2 | 7.7 | 11.4 |
| Ex. 2 | S—B—I—S | 15 | 30 | 40 | 15 | 11.2 | 7.8 | 12.5 |
| Ex. 3 | S—B—I—S | 15 | 45 | 25 | 15 | 12.8 | 7.4 | 11.3 |
| Ex. 4 | S—B—I—S | 10 | 40 | 40 | 10 | 15.6 | 7.5 | 13.1 |
| Ex. 5 | S—B—I—S | 20 | 30 | 30 | 20 | 11.4 | 7.8 | 12.0 |
| Ex. 6 | (S—B—I)$_2$—X (*1) | 15 | 15 | 20 | — | 10.7 | 7.6 | 11.8 |
| Ex. 7 | (S—I—B)$_2$—X (*1) | 15 | 20 | 15 | — | 11.5 | 7.5 | 11.9 |
| Comp. Ex. 1 | S—B—I—S | 15 | 5 | 65 | 15 | 11.5 | 7.8 | 11.3 |
| Comp. Ex. 2 | S—B—I—S | 15 | 65 | 5 | 15 | 10.6 | 7.7 | 12.8 |
| Comp. Ex. 3 | S—I—S | 15 | — | 70 | 15 | 10.8 | — | 13.4 |
| Comp. Ex. 4 | S—B—S | 15 | 70 | — | 15 | 14.8 | 7.9 | — |
| Comp. Ex. 5 | S—I—S/ S—B—S = 5/2 (*2) | 15 | 20 | 50 | 15 | 12.4 | 7.6 | 11.5 |
| Comp. Ex. 6 | S—I—S/ S—B—S = 2/5 (*2) | 15 | 50 | 20 | 15 | 11.5 | 7.8 | 12.3 |

TABLE 2

| | Molecular structure of block copolymer | Viscoelasticity measurement G' × 10⁻⁶ (Pa) | tan δ peak temperature (°C.) | Change of melt viscosity with time | | | | Pressure-sensitive adhesion properties | | |
|---|---|---|---|---|---|---|---|---|---|---|
| | | | | 0 min | 5 min | 10 min | 15 min | Tack | Adhesive strength | Holding power |
| Ex. 1 | S—B—I—S | 4.4 | −57 | 1.0 | 1.0 | 1.0 | 0.9 | 13.3 | 690 | 62 |
| Ex. 2 | S—B—I—S | 5.6 | −65 | 1.0 | 1.0 | 1.0 | 1.0 | 12.7 | 650 | 81 |
| Ex. 3 | S—B—I—S | 8.5 | −71 | 1.0 | 1.0 | 1.1 | 1.3 | 12.0 | 590 | 84 |
| Ex. 4 | S—B—I—S | 3.0 | −67 | 1.0 | 1.0 | 1.1 | 1.2 | 14.5 | 550 | 48 |
| Ex. 5 | S—B—I—S | 10.1 | −67 | 1.0 | 1.0 | 1.1 | 1.2 | 9.5 | 802 | 109 |
| Ex. 6 | (S—B—I)₂—X (*1) | 6.1 | −65 | 1.0 | 1.0 | 1.0 | 1.0 | 13.0 | 623 | 63 |
| Ex. 7 | (S—I—B)₂—X (*1) | 8.0 | −69 | 1.0 | 1.0 | 1.2 | 1.4 | 12.1 | 565 | 65 |
| Comp. Ex. 1 | S—B—I—S | 3.8 | −52 | 1.0 | 0.8 | 0.7 | 0.5 | 11.0 | 710 | 40 |
| Comp. Ex. 2 | S—B—I—S | 7.0 | −78 | 1.0 | 1.4 | 4.0 | >>5 | 10.5 | 520 | 42 |
| Comp. Ex. 3 | S—I—S | 3.6 | −49 | 1.0 | 0.8 | 0.7 | 0.6 | 16.0 | 720 | 27 |
| Comp. Ex. 4 | S—B—S | 6.2 | −85 | 1.0 | 1.5 | 4.5 | >>5 | 8.0 | 500 | 36 |
| Comp. Ex. 5 | S—I—S/ S—B—S = 5/2 (*2) | 4.2 | −80/−51 | 1.0 | 1.5 | 2.0 | 3.0 | 9.0 | 710 | 28 |
| Comp. Ex. 6 | S—I—S/ S—B—S = 2/5 (*2) | 6.0 | −74/−53 | 1.0 | 1.4 | 3.8 | >>5 | 8.5 | 620 | 92 |

(Note)
*1: The compositions of these polymer blocks are those prior to the coupling.
*2: Two peak temperatures on tan δ exist in each of these blends.

As apparent from the results shown in Tables 1–2, it is understood that the block copolymers (Examples 1–7) according to the present invention scarcely undergo a change of melt viscosity with time and hence are excellent in heat stability. In addition, the pressure sensitive adhesive tapes separately comprising, as base polymers, the block copolymers according to the present invention are on a high level in physical properties as to tack, adhesive strength and holding power. Incidentally, the pressure sensitive adhesive tapes were produced by the solution coating process upon the measurement of the pressure-sensitive adhesion properties. However, it goes without saying that a pressure sensitive adhesive tape may be produced by using the pressure sensitive adhesive composition according to the present invention and directly applying it to a base material by the melt processing process.

On the other hand, the block copolymers (Comparative Examples 1–2) in which the proportions of the bound butadiene and the bound isoprene were outside the ranges of the present invention, the SIS type block copolymer or the SBS type block copolymer (Comparative Examples 3–4), and the blends (Comparative Examples 5–6) of the SIS type block copolymer or the SBS type block copolymer all underwent great changes of melt viscosity with time and were hence poor in heat stability. Besides, the pressure sensitive adhesive compositions separately comprising, as base polymers, these block copolymers or blends according to the comparative examples were poorly balanced among tack, adhesive strength and holding power.

INDUSTRIAL APPLICABILITY

According to the present invention, there are provided novel block copolymers which have the characteristics as a thermoplastic elastomer, scarcely undergo a change of melt viscosity with time and are excellent in heat stability. According to the present invention, there are also novel block copolymers suitable for base polymers for pressure sensitive adhesive compositions, particularly, hot-melt type pressure sensitive adhesive compositions. According to the present invention, there are further provided pressure sensitive adhesive compositions separately comprising, as base polymers, the novel block copolymers excellent in heat stability, particularly, hot-melt type pressure sensitive adhesive compositions excellent in coating properties, flowability, pressure-sensitive adhesion properties and the like.

We claim:
1. A block copolymer:
   (a) comprising a polymer block of an aromatic vinyl compound, a polymer block of butadiene and a polymer block of isoprene;
   (b) having a weight average molecular weight of 10,000–500,000;
   (c) containing a bound aromatic vinyl compound in a proportion of 10–50 wt. %;
   (d) containing bound butadiene in a proportion of 10–60 wt. %;
   (e) containing bound isoprene in a proportion of 10–60 wt. %;
   (f) containing 1,2-vinyl bonds in a butadiene segment in a proportion of at most 15 wt. %;
   (g) containing 3,4-vinyl bonds in an isoprene segment in a proportion of at most 10 wt. %;
   (h) having a storage modulus (G') of $10^6$–$3 \times 10^8$ Pa in a viscoelasticity measurement in a temperature range of from 0° C. to 50° C.;
   (i) having only one peak on loss tangent (tan δ) attributable to the butadiene polymer block and the isoprene polymer block in a temperature range of from −80° C. to −50° C.; and (j) being represented by the formula [1]:

(S—B—Z—S)      [1]

wherein S is the polymer block of the aromatic vinyl compound, B is the polymer block of butadiene, and I is the polymer block of isoprene.

2. A block copolymer:
(a) comprising a polymer block of an aromatic vinyl compound, a polymer block of butadiene and a polymer block of isoprene;
(b) having a weight average molecular weight of 10,000–500,000;
(c) containing a bound aromatic vinyl compound in a proportion of 10–50 wt. %;
(d) containing bound butadiene in a proportion of 10–60 wt. %;
(e) containing bound isoprene in a proportion of 10–60 wt. %;
(f) containing 1,2-vinyl bonds in a butadiene segment in a proportion of at most 15 wt. %;
(g) containing 3,4-vinyl bonds in an isoprene segment in a proportion of at most 10 wt. %;
(h) having a storage modulus (G') of $10^6$–$3\times10^8$ Pa in a viscoelasticity measurement in a temperature range of from 0° C. to 50° C.;
(i) having only one peak on loss tangent (tan δ) attributable to the butadiene polymer block and the isoprene polymer block in a temperature range of from −80° C. to −50° C.; and
(j) being represented by the formula [2]:

(S—B—I)$_n$—X      [2]

wherein S is the polymer block of the aromatic vinyl compound, B is the polymer block of butadiene, I is the polymer block of isoprene, n is an integer of 2–4, and X is a residue of a coupling agent.

3. A pressure sensitive adhesive composition comprising
(1) 100 parts by weight of a block copolymer:
(a) comprising a polymer block of an aromatic vinyl compound, a polymer block of butadiene and a polymer block of isoprene;
(b) having a weight average molecular weight of 10,000–500,000;
(c) containing a bound aromatic vinyl compound in a proportion of 10–50 wt. %;
(d) containing bound butadiene in a proportion of −10–60 wt. %;
(e) containing bound isoprene in a proportion of −10–60 wt. %;
(f) containing 1,2-vinyl bonds in a butadiene segment in a proportion of at most 15 wt. %;
(g) containing 3,4-vinyl bonds in an isoprene segment in a proportion of at most 10 wt. %;
(h) having a storage modulus (G') of $10^6$–$3\times10^8$ Pa in a viscoelasticity measurement in a temperature range of from 0° C. to 50° C.;
(i) having only one peak on loss tangent (tan δ) attributable to the butadiene polymer block and the isoprene polymer block in a temperature range of from −80° C. to −50° C.; and
(j) being represented by the formula [1]:

(S—B—I—S)      [1]

wherein S is the polymer block of the aromatic vinyl compound, B is the polymer block of butadiene, and I is the polymer block of isoprene, and (2) 20–200 parts by weight of a tackifier.

4. The pressure sensitive adhesive composition according to claim 3, which is a hot-melt adhesive.

5. A pressure sensitive adhesive composition comprising
(1) 100 parts by weight of a block copolymer:
(a) comprising a polymer block of an aromatic vinyl compound, a polymer block of butadiene and a polymer block of isoprene;
(b) having a weight average molecular weight of 10,000–500,000;
(c) containing a bound aromatic vinyl compound in a proportion of 10–50 wt. %;
(d) containing bound butadiene in a proportion of 10–60 wt. %;
(e) containing bound isoprene in a proportion of 10–60 wt. %;
(f) containing 1,2-vinyl bonds in a butadiene segment in a proportion of at most 15 wt. %;
(g) containing 3,4-vinyl bonds in an isoprene segment in a proportion of at most 10 wt. %;
(h) having a storage modulus (G') of $10^6$–$3\times10^8$ Pa in a viscoelasticity measurement in a temperature range of from 0° C. to 50° C.;
(i) having only one peak on loss tangent (tan δ) attributable to the butadiene polymer block and the isoprene polymer block in a temperature range of from −80° C. to −50° C.; and
(j) being represented by the formula [2]:

(S—B—I)$_n$—X      [2]

wherein S is the polymer block of the aromatic vinyl compound, B is the polymer block of butadiene, I is the polymer block of isoprene, n is an integer of 2–4, and X is a residue of a coupling agent, and (2) 20–200 parts by weight of a tackifier.

6. The pressure sensitive adhesive composition according to claim 5, which is a hot-melt adhesive.

* * * * *